cessity of heating prior to application of the polymer as an adhesive.

United States Patent Office 3,595,826
Patented July 27, 1971

3,595,826
PROCESS FOR PREPARING IMPROVED 2,3-DICHLORO-1,3-BUTADIENE ADHESIVES
Wendell R. Conard, Kent, Ohio, assignor to The Firestone Tire & Rubber Company, Akron, Ohio
No Drawing. Filed May 24, 1968, Ser. No. 731,728
Int. Cl. C08c 11/22, 11/24; C09j 3/12
U.S. Cl. 260—33.6
13 Claims

ABSTRACT OF THE DISCLOSURE

The process described herein comprises an improved method for preparing copolymers of 2,3-dichloro-1,3-butadiene and acrylonitrile to produce adhesive compositions of improved solubility such that the composition does not need to be heated prior to application as is the case in presently known copolymers of this type. The process used herein produces a product of improved solubility by virtue of the fact that the copolymer is prepared by continuous or incremental addition of the dichlorobutadiene monomer as the polymerization proceeds. In this way the copolymers produced toward the end of the copolymerization period closely resemble in molecular weight, monomer distribution and various other properties the copolymers produced at the beginning of the copolymerization. Consequently the resulting copolymer is homogeneous, has improved solubility, can be applied "cold," that is without prior heating, and has excellent adhesive properties.

BACKGROUND OF THE INVENTION

Field of the invention

This invention relates to a process for preparing an improved adhesive composition. More specifically, it relates to a process for preparing a copolymer of 2,3-dichloro-1,3-butadiene and acrylonitrile which gives a copolymer of improved solubility, thereby avoiding the necessity for heating prior to application.

Related prior art

The prior art discloses polymers of dichlorobutadiene as well as various copolymers thereof. However, those which are known to have good adhesive properties have the disadvantages of poor solubility, or tendency toward gellation, and the necessity for the application of heat prior to application for adhesive purposes. In such copolymers in which the comonomer is of a type to give improved solubility or in which the amount of comonomer is increased to give improved solubility, the adhesive properties are very poor.

For example, Kuhn U.S. Patent 2,581,920 discloses polymers of 2,3-dichloro-1,3-butadiene, including copolymers with numerous comonomers. However, these polymers form gels immediately upon polymerization or after standing for even relatively short storage periods, even if they are immediately combined with the other components of adhesive compositions. Consequently, these polymers require heating in an organic solvent such as toluene at a temperature of at least 60° C. to break the gel and convert the copolymer to a useful composition. Moreover, these polymers showing this tendency for gellation require heat prior to application to render them fluid.

Subsequent to the application of the above patent, Reynolds U.S. Patent 2,725,373 was granted on a process, and the product obtained thereby, for brominating polymers of 2,3-dichloro-1,3-butadiene to improve the solubility of the polymers and thereby avoid the necessity to break the gel and to heat prior to application of the polymer as an adhesive.

SUMMARY OF THE INVENTION

Surprisingly, it has now been found that copolymers of 2,3-dichloro-1,3-butadiene and acrylonitrile or methacrylonitrile, can be prepared having excellent adhesive characteristics and improved solubility, which do not require degelling or heating prior to application. These copolymers are produced by the process of adding the dichlorobutadiene continuously or incrementally during the polymerization. In this way the relative ratio of the comonomers is maintained at 5–19, preferably 7–9 parts by weight of dichlorobutadiene per part of acrylonitrile throughout the polymerization with the result that the copolymers have a more uniform acrylonitrile content in the copolymer molecules.

If a batch polymerization is conducted using approximately 88 parts of the dichlorobutadiene and approximately 12 parts of acrylonitrile, the copolymer produced at the beginning of the copolymerization contains about 0.8% acrylonitrile and towards the end of the polymerization the copolymer formed contains approximately 3% acrylonitrile, so that the overall copolymer contains an average of approximately 2% acrylonitrile. It has been shown that polymers containing 2–3% acrylonitrile produce poorer adhesives. Therefore, it would be desirable to avoid the formation of polymers having this higher content of acrylonitrile.

The process of this invention is designed so that additional dichlorobutadiene is introduced continuously or incrementally throughout the polymerization so that the relative ratio of free monomers is maintained throughout the copolymerization. In this way the copolymer produced at the end of the copolymerization period more closely resembles in acrylonitrile content, the copolymer produced at the beginning of the polymerization. It is generally desirable that the copolymer structure be relatively homogeneous and contain in the range of 0.7–1.0% acrylonitrile. This relatively homogeneous composition has improved solubility, and avoids gellation and the need to heat the adhesive composition prior to application.

The most favorable results are obtained in the copolymer when the monomeric mixture throughout the polymerization period is maintained at approximately 95–85% by weight of the dichlorobutadiene monomer and 5–15%, preferably 10–12% acrylonitrile or methacrylonitrile. The resultant copolymers preferably contain in the copolymer molecules about 0.7–1% acrylonitrile or methacrylonitrile.

While relatively pure 2,3-dichloro-1,3-butadiene can be used, for reasons of availability and economics the monomer is generally a mixture containing a major portion of the 2,3-dichloro-1,3-butadiene with the balance being primarily dichlorobutadiene isomers and related compounds. A monomer mixture is commercially available which contains about 70% of 2,3-dichloro-1,3-butadiene with the remainder comprising other dichlorobutadienes, chlorovinyl acetylene, trichlorobutadiene and the like. While these other monomeric materials are also copolymerized to a considerable extent, the resultant copolymer with the acrylonitrile is referred to herein as a "copolymer" of 2,3-dichloro-1,3-butadiene and acrylonitrile for purpose of simplicity.

In the commercial 2,3-dichloro-1,3-butadiene used in the examples described below there are a number of isomers and related compounds which copolymerize with the 2,3-dichloro-1,3-butadiene. These include 1,2-dichloro-1,3-butadiene, monochloro-1,3-butadiene, trichloro-butadiene and chloro-vinylacetylene. There is also present 10–20% of normally nonpolymerizable compounds such as 1,4-dichloro-1,3-butadiene, 1,3-dichloro-1,3-butadiene and dichlorobutene.

Advantageously the polymerization is conducted in an inert solvent such as a hydrocarbon, preferably an aromatic hydrocarbon such as toluene or xylene, or a chlorinated hydrocarbon. Generally a solvent is selected which is also suitable for the ultimate adhesive composition and therefore does not need to be removed. A wide variety of solvents may be used for this purpose including benzene, toluene, xylene, ethylene dichloride, cyclohexane, carbon tetrachloride, trichloroethylene, dichlorobenzenes, chlorobenzene, tetrachloroethylene, trichlorobenzenes and the like. In cases where the solvents are toxic, such as di- and tri-chlorobenzenes, they are used only where special precautions can be taken in their use and application of the adhesive compositions. It is generally desirable to conduct the polymerization in solution containing about 10–50% by weight of the monomer mixture.

The polymerizations are generally conducted at a temperature of 40–100° C., preferably 70–90° C., depending upon the particular catalyst or activator being used. With benzoyl peroxide a temperature of about 80° C. is preferred. Conditions are advantageously those which produce polymers having a relative viscosity of 1.90–2.30 in a 4 percent solution in tetrachloroethylene when measured at 25° C.

For catalyzing or activating the polymerization, various well-known free-radical generating catalysts such as peroxides and hydroperoxides, including the following can be used:

Cumene hydroperoxide
Perheptanoic acid
Dichloorbenzoyl peroxide
Tertiary-butyl hydroperoxide
Benzoyl peroxide
Tertiary-butyl perbenzoate
Acetyl benzoyl peroxide
Caprylyl peroxide
Lauroyl peroxide
Hydroxyheptyl peroxide
Methylethyl ketone peroxide
1-hydroxycyclohexyl hydroperoxide-1
Ditertiary-butyl perphthalate
Dibenzaldiperoxide
Tertiary-butyl peroxide
2,2-(tertiary-butylperoxy)butane
Bis(para-bromobenzoyl)peroxide
Bis(phthalyl)peroxide
Bis(parachlorobenzoyl)peroxide
Bis(succinyl)peroxide
Acetylbenzoyl peroxide
Bis(chloroacetyl)peroxide
Bis(acetyl)peroxide
Tertiary-butyl perbenzoate
Tertiary-butyl hydroperoxide
Bis(dichlorobenzoyl)peroxide
Di-isopropylene ozonide and di-isobutylene ozonide
Peracetic acid
Perbenzoic acid
Benzoyl peracetate
Ethyl peroxydicarbonate;

Azo catalysts such as:

Azo-bis-isobutyronitrile
Dimethyl azodiisobutyrate
Azo-bis-(α-methyl)-carboxybutyronitrile and the like;

Redox systems such as:

Ferric sulfate-ascorbic acid-$H_2O_2$
Tributylboran-t-Bu-hydroperoxide
Other trialkylborane-hydroperoxide combinations, and the like.

Generally 0.1%–5% of the catalyst is suitable based on the combined weight of the monomers.

It is preferred that the polymerizations be taken only to such a stage that the product does not reach an infusible, insoluble state. While even such compositions can be used as adhesives by conducting the polymerizations to such a cured state in situ between the materials to be adhered, it is preferable to stop the polymerization at a stage where the resins are fusible and sufficiently soluble in organic solvents to admit application of the adhesives in the form of fluid cements. Generally this condition is maintained by limiting the molecular weight to that which gives a relative viscosity of 1.5–3.0, preferably 1.7–2.3 measured at 25° C. for a solution of 4 gm. of copolymer in 100 cc. of tetrachloroethylene.

In preparing the adhesive compositions, it is desirable in many cases, particularly where elastomers are to be bonded to metallic surfaces that the copolymers of this invention be mixed with a chlorinated elastomer. Suitable elastomers for this purpose include the well-known chlorinated and hydrochlorinated derivatives of synthetic and natural elastomers, particularly chlorinated natural rubber and chlorinated polybutadiene.

A particularly preferred chlorinated elastomer for preparing the adhesive compositions is one available commercially which has 63–68% chlorine, preferably 67–68%, and has a viscosity of approximately 125 centipoises in a 20% solution in toluene. However, chlorinated elastomers of 100–300 centipoises in similar solutions can also be used and if desired appropriate modifications can be used in the concentrations to give the desired fluidity in the adhesive cement. Generally, however, it is desirable to use sufficient solvent to give a solids content of 20–30% and it is generally desirable to use 0.1–9 parts by weight of chlorinated elastomer per part by weight of copolymer.

However, other chlorinated and hydrochlorinated elastomers, such as balata, gutta percha, Chilte gum, the Buna rubbers, polyisobutylene and neoprene, can also be used. Generally, about 10–90% of such a chlorinated elastomer based on the combined weight of chlorinated elastomer and copolymer may be employed in the adhesive compositions of this invention, particularly for use in adhering elastomers to metals.

In preparing the adhesive cement, the amount of solvent is adjusted in accordance with the desired application properties in the cement. Generally cements containing 20–95% of solvent are appropriate for application by brushing, spraying, dipping and the like. In addition to application in solution form, the adhesive composition can be applied as an emulsion or latex, in the form of an unsupported film, or in the form of a paper web or metallic foil coated with the composition.

The invention is illustrated by reference to the following examples. These examples are given merely for purpose of illustration and are not intended to limit the scope of the invention nor the manner in which it may be practiced. Parts and percentages are given by weight.

In the following examples, unless specified otherwise, the polymerizations are conducted in 2-liter flasks equipped with stirrer, heating means, air for cooling, means for removing samples and a graduated dropping funnel for feeding monomer continuously or intermittently into the flask.

In testing the respective copolymers in adhesive compositions, the following procedure is used. In each case a well-blended mixture is prepared so as to have a total solids content of 24% which comprises 18.8% of the specific copolymer, 66.2% of chlorinated rubber and 15% of carbon black, sufficient toluene being used to give the 24% of total solids. Each adhesive composition or cement is tested by application to a sand blasted, degreased steel metal strip and a rubber strip of corresponding size placed thereover. Two test strips are thus prepared for each cement. After the samples are cured for 30 minutes at 312° F. and cooled, the adhesion is tested by determining the pounds pulled on a tensile machine in order to tear the rubber from the steel strip. An Instron Tester or Scott Tester can be used for this purpose. The values reported are for the average pound pull and the average percent stock failure of the two respective pieces.

Example I.—A control run is conducted using 88 parts of 2,3-dichloro-1,3-butadiene, 12 parts of acrylonitrile, 400 parts of toluene and 2 parts of benzoyl peroxide. The polymerization is conducted at 80° C. until samples removed periodically indicate that the conversion has been carried to approximately 56%. These samples are also analyzed or tested. The polymer formed at the beginning of the polymerization has a relative viscosity of 3.55 when measured at 25° C. in a 4% solution in tetrachloroethylene. At the end of the polymerization, the relative viscosity for the total polymer produced is 2.45. Since the polymer product still contains the polymer formed at the beginning and throughout the polymerization, the polymer produced at the end of the polymerization period obviously has a relative viscosity much lower than this final reading. The polymer produced initially during this polymerization contains abopt 0.8% of acrylonitrile and the composite polymer product produced over the entire polymerization period has a content of over 2% acrylonitrile. This means that the polymer molecules formed toward the end of the polymerization period contain approximately 3% acrylonitrile. Such copolymers containing 2–3% acrylonitrile show much poorer adhesive properties than those containing about 0.7–1% acrylonitrile.

Example II.—A polymerization is conducted using initially the quantities of reagents used in Example I but in addition, a solution of 250 parts containing 150 parts of 2,3-dichloro-1,3-butadiene is added by means of the graduated dropping funnel at a steady rate throughout the polymerization period. At the end of each half hour period, a sample is removed for determination of relative viscosity and percent total solvents. Various calculations are made each time. These results are reported below in Table I. As will be noted the DCB/AN monomer ratio is maintained at approximately 7–8/1 throughout the polymerization and the relative viscosity of the polymer product is maintained in the range of 1.79–1.92. In this way the polymer prepared by this procedure has a relatively constant composition. Samples of this material, upon standing, have remained clear for 6 weeks. Samples of the product produced according to Example I become turbid when cooled and polymer gel is formed and settles out within 1 or 2 weeks. This insolubility is reflected in the adhesion tests.

TABLE I

| Time (hrs.) | Added DCB monomer (gms.) | Percent total solids | Monomer remaining (gms.) | DCB/AN ratio as monomer | Relative viscosity |
|---|---|---|---|---|---|
| 0 | | | 100 | 7.33/1 | |
| 0.5 | 13.75 | 4.62 | 89.4 | | 1.88 |
| 1.0 | 30.00 | 7.16 | 90.2 | | |
| 1.5 | 50.00 | 9.90 | 91.1 | 6.94/1 | 1.92 |
| 2.0 | 62.5 | 11.35 | 93.1 | | |
| 2.5 | 75.0 | 12.9 | 93.4 | | 1.89 |
| 3.0 | 90.0 | 14.35 | 95.6 | | |
| 3.5 | 98.75 | 15.75 | 92.9 | 7.47/1 | 1.91 |
| 4.0 | 111.88 | 17.17 | 92.9 | | |
| 4.5 | 123.75 | 18.2 | 93.8 | | 1.87 |
| 5.0 | 137.5 | 19.6 | 93.1 | | |
| 5.5 | 150.0 | 20.4 | 95.4 | 8.09/1 | 1.79 |

Example III.—The procedure of Example II is repeated using a polymerization temperature of 70–80° C. The results are reported below in Table II.

TABLE II

| Time (hrs.) | DCB monomer added (gms.) | Percent total solids | Percent conversion | Remaining monomer (gms.) | DCB/AN ratio as monomer | Rel. visc. |
|---|---|---|---|---|---|---|
| 0 | | | | | 7.33 | |
| 0.5 | 24 | 5.45 | 23.81 | 94.20 | | |
| 1.0 | 40 | 8.07 | 32.81 | 93.65 | | 2.28 |
| 1.5 | 63 | 10.4 | 38.79 | 99.42 | 7.65 | |
| 2.0 | 83 | 12.5 | 43.91 | 101.98 | | 2.15 |
| 2.5 | 101 | 14.1 | 47.20 | 105.6 | | |
| 3.0 | 117 | 15.4 | 49.69 | 108.5 | | 2.17 |
| 3.5 | 138 | 17.3 | 53.45 | 110.3 | | |
| 4.0 | 150 | 17.25 | 52.18 | 118.8 | | 2.15 |
| 4.5 | 150 | 19.25 | 57.8 | 105.5 | | |
| 5.0 [1] | 150 | 19.1 | | | 8.7 | 2.13 |

[1] Final product remained relatively clear after standing for 7 days. When tested as adhesive component after standing for 7 days, the adhesive composition gives very good results having an average pound pull of 72 and a percent stock failure of 99%. After standing for 2 months, it shows in an adhesive composition 74 aver. lb. pull and 90% stock failure.

The invention claimed is:

1. A process for producing copolymers of 2,3-dichloro-1,3-butadiene and an unsaturated nitrile selected from the class consisting of acrylonitrile and methacrylonitrile of improved adhesive and solubility properties comprising the steps of:
    (a) initiating solution copolymerization of said 2,3-dichloro-1,3-butadiene and said nitrile in a mixture containing the two said monomers in a proportion of 5–19 parts by weights of said dichlorobutadiene per part by weight of said nitrile, and
    (b) continuing said copolymerization and continually adding during the major part of said copolymerization additional dichlorobutadiene monomer in such amount to maintain the ratio of said dichlorobutadiene to said nitrile in the range of 5–19 parts by weight of said dichlorobutadiene per part by weight of said nitrile.

2. The process of claim 1 in which said proportion is maintained at 7–9 parts by weight of said dichlorobutadiene per part by weight of said nitrile.

3. The process of claim 2 in which said nitrile is acrylonitrile.

4. The process of claim 3 in which said polymerization is conducted at a temperature of 40–100° C.

5. The process of claim 4 in which said temperature is in the range of 70–90° C.

6. The process of claim 5 in which said polymerization is effected while said dichlorobutadiene and said nitrile are dissolved in a solvent inert to the polymerization and having a concentration of 10–50% by weight of the mixture therein.

7. The process of claim 6 in which said solvent is toluene.

8. A copolymer of 2,3-dichloro-1,3-butadiene and acrylonitrile prepared according to the process of claim 1 and having 0.7–1% by weight of acrylonitrile in each of the copolymer molecules thereof.

9. An adhesive composition comprising a mixture of 10–90% by weight of said copolymer of claim 8 and 90–

10% by weight of a chlorinated elastomer, said mixture being dissolved in 20–95% by weight of solvent.

10. The composition of claim 9 in which said chlorinated elastomer is a chlorinated elastomer having 63–68 percent by weight chlorine and a viscosity of 100–300 centipoises in a 20 percent solution in toluene.

11. The composition of claim 10 in which said solvent is toluene.

12. The composition of claim 11 in which said viscosity is about 125.

13. The composition of claim 9 in which said solvent is toluene.

References Cited

UNITED STATES PATENTS

| 2,496,384 | 2/1950 | De Nie | 260—95C |
| 2,581,920 | 1/1952 | Kuhn | 161—217 |

ALLAN LIEBERMAN, Primary Examiner

H. H. FLETCHER, Assistant Examiner

U.S. Cl. X.R.

156—333; 260—33.8, 34.2, 82.3, 95, 890